(12) United States Patent
Tonelli et al.

(10) Patent No.: US 9,265,379 B2
(45) Date of Patent: Feb. 23, 2016

(54) STEAM UNIT WITH EXTERNAL FASTENING, INCLUDING A TANK FOR FROTHING MILK AND HEATING BEVERAGES, FOR A MACHINE FOR ESPRESSO BEVERAGES

(75) Inventors: Stefano Tonelli, Gaggio Montano (IT); Cristiano Castelli, Porretta Terme (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1851 days.

(21) Appl. No.: 11/920,128

(22) PCT Filed: May 15, 2006

(86) PCT No.: PCT/EP2006/062308
§ 371 (c)(1),
(2), (4) Date: Nov. 9, 2007

(87) PCT Pub. No.: WO2006/122916
PCT Pub. Date: Nov. 23, 2006

(65) Prior Publication Data
US 2009/0101021 A1    Apr. 23, 2009

(30) Foreign Application Priority Data

May 16, 2005    (IT) .............................. MI2005A0880

(51) Int. Cl.
*A47J 31/44*    (2006.01)
(52) U.S. Cl.
CPC .................................. *A47J 31/4485* (2013.01)
(58) Field of Classification Search
CPC ....... A47J 31/4489; A47J 31/44; A47J 31/54; A47J 31/462; A47J 31/057; A47J 31/002; A47J 31/061; A47J 31/3671; A47J 31/368; A47J 31/4485; A47J 31/46; A47J 31/04; A47J 31/0576
USPC ........... 99/290, 293–323, 410, 417, 275, 279, 99/282–283; 222/373, 146.1–146.5, 652; 122/13.01–19.2, 234; D7/313; 126/348; 219/452.11, 478
See application file for complete search history.

(56) References Cited

U.S. PATENT DOCUMENTS 1,474,270 A * 11/1923 Lewis ........................... 285/100
1,762,303 A *  6/1930 McBride ........................ 99/303
1,796,518 A *  3/1931 Glascock ....................... 99/291
2,371,328 A *  3/1945 Herrera ......................... 99/282

(Continued)

FOREIGN PATENT DOCUMENTS

DE    19545111 A1 *  6/1997   ............ A47J 31/057
FR     769848 A   *  3/1934

(Continued)

OTHER PUBLICATIONS

International Search Report for PCT/EP2006/062308 mailed Sep. 11, 2006.

*Primary Examiner* — Dana Ross
*Assistant Examiner* — Brandon Harvey

(57) ABSTRACT

A steam unit, e.g., for a machine for espresso beverages, includes a supporting island with external fastening, which connects removably to the machine; a tank for frothing milk, a base of which connects removably to the supporting island. A circuit delivers steam from the machine to the tank via the connection at the base of the tank. The tank includes an upper part for heating and emulsifying the beverages.

25 Claims, 10 Drawing Sheets

(56) References Cited

U.S. PATENT DOCUMENTS

| | | | | |
|---|---|---|---|---|
| 2,598,377 A | * | 5/1952 | Herrera | 222/373 |
| 2,628,553 A | * | 2/1953 | Titus | 99/300 |
| 2,822,746 A | * | 2/1958 | Schwall | 99/287 |
| 3,261,279 A | * | 7/1966 | Kaplan et al. | 99/282 |
| 3,316,388 A | * | 4/1967 | Wickenberg et al. | 219/442 |
| 3,665,841 A | * | 5/1972 | Hardy et al. | 99/281 |
| 3,757,670 A | * | 9/1973 | Laama et al. | 99/302 R |
| 4,356,382 A | * | 10/1982 | Keramati et al. | 392/471 |
| 4,498,375 A | * | 2/1985 | Bedini | 99/303 |
| 5,014,611 A | * | 5/1991 | Illy et al. | 99/280 |
| 5,046,409 A | * | 9/1991 | Henn | 99/307 |
| 5,154,110 A | * | 10/1992 | Chang | 99/281 |
| 5,267,506 A | * | 12/1993 | Cai | 99/280 |
| 5,272,960 A | * | 12/1993 | Kinna | 99/280 |
| 5,335,588 A | * | 8/1994 | Mahlich | 99/293 |
| 5,339,725 A | * | 8/1994 | De'Longhi | 99/293 |
| 5,372,061 A | * | 12/1994 | Albert et al. | 99/281 |
| 5,388,501 A | * | 2/1995 | Hazan et al. | 99/285 |
| 5,473,972 A | * | 12/1995 | Rizzuto et al. | 99/290 |
| 5,531,378 A | * | 7/1996 | Roberts | 237/67 |
| 5,611,262 A | * | 3/1997 | Rizzuto et al. | 99/294 |
| 5,628,239 A | | 5/1997 | Wu et al. | |
| 5,699,718 A | * | 12/1997 | Yung et al. | 99/292 |
| 5,829,340 A | * | 11/1998 | Yang | 99/290 |
| 5,865,095 A | * | 2/1999 | Mulle | 99/293 |
| 5,865,097 A | * | 2/1999 | Smit | 99/323.3 |
| 5,884,552 A | * | 3/1999 | Lussi et al. | 99/323.1 |
| 6,164,189 A | * | 12/2000 | Anson | 99/281 |
| 6,196,422 B1 | * | 3/2001 | Tuyls et al. | 222/129.1 |
| 6,202,541 B1 | * | 3/2001 | Cai | 99/286 |
| 6,223,938 B1 | * | 5/2001 | Pare et al. | 222/63 |
| 6,817,279 B2 | * | 11/2004 | Leung et al. | 99/287 |
| 6,823,771 B2 | * | 11/2004 | Piazza | 99/303 |
| 6,840,163 B2 | * | 1/2005 | Oldani et al. | 99/453 |
| 6,843,165 B2 | * | 1/2005 | Stoner | 99/295 |
| 6,942,467 B2 | * | 9/2005 | Deninger et al. | 417/313 |
| 2002/0124735 A1 | * | 9/2002 | Scott et al. | 99/275 |
| 2003/0051603 A1 | * | 3/2003 | Yoakim et al. | 99/279 |
| 2004/0065208 A1 | * | 4/2004 | Hart et al. | 99/275 |
| 2004/0231522 A1 | * | 11/2004 | Burrows et al. | 99/279 |
| 2005/0193892 A1 | * | 9/2005 | Rahn et al. | 99/279 |
| 2005/0204925 A1 | * | 9/2005 | Orrico et al. | 99/275 |
| 2005/0279215 A1 | * | 12/2005 | Cai | 99/279 |
| 2006/0112830 A1 | * | 6/2006 | Pasquini | 99/275 |

FOREIGN PATENT DOCUMENTS

| | | |
|---|---|---|
| FR | 769848 A | 9/1934 |
| GB | 382972 A | 11/1932 |
| WO | 01 97668 | 12/2001 |

\* cited by examiner

STEAM UNIT WITH EXTERNAL FASTENING, INCLUDING A TANK FOR FROTHING MILK AND HEATING BEVERAGES, FOR A MACHINE FOR ESPRESSO BEVERAGES

This application is the U.S. national phase of International Application No. PCT/EP2006/062308 filed 15 May 2006 which designated the U.S. and claims priority to Italian Patent Application No. MI2005A000880 filed 15 May 2006, the entire contents of each of which are hereby incorporated by reference.

BACKGROUND OF THE INVENTION

The present invention relates to a steam unit with external fastening, including a tank for frothing milk or heating beverages, for a machine for espresso beverages.

External steam units for frothing milk for use in a machine for espresso beverages are known in the art. Espresso beverages typically include espresso coffee.

In general said known units have problems of reliability due to possible clogging of the steam output circuit, caused by interaction with the milk, or safety problems due to the pressure of steam or, to the presence of electrical circuits which could interact with the steam or with the milk, or problems related to the difficulty in cleaning them, caused by difficult access to the parts which must be kept clean.

These problems may arise for example in cases where in a container for frothing milk, the frothing occurs in the bottom side of the container, as for example disclosed in documents GB-382972 or FR-769848.

Document WO-01/97668 discloses a container for frothing milk, having an inlet in the bottom for receiving steam from a base; a tube is connected to the inlet in the bottom for bringing the steam to the internal bottom part of the container, where a second tube brings air from the top for heating and frothing the milk: this also creates problems as described above. Additional problems arise for cleaning the terminals of the tubes: in fact the container must be emptied before cleaning. Moreover, frothing the milk in the bottom does not allow milk as such to be maintained separated from froth in the bottom part of the container.

SUMMARY OF THE INVENTION

Therefore, the purpose of the present invention is to solve the aforesaid problems and to indicate a steam unit, in particular for espresso beverages, including: a supporting island with external fastening, which connects removably to said machine; a tank, the base of which connects removably to said supporting island, said supporting island in turn including a hydraulic circuit to deliver steam from said machine to said tank, by means of said connection at the base of the tank; said tank including an upper part for heating and emulsifying the beverages.

The present invention relates in particular to a steam unit with external fastening, including a tank for frothing milk or for heating beverages, for a machine for espresso beverages, and a relative tank, as better described in the claims, which form an integral part of the present description.

BRIEF DESCRIPTION OF THE DRAWING

The purposes and advantages of the present invention shall be more apparent from the detailed description provided hereunder of an embodiment thereof (and of its variants) and from the accompanying drawings provided purely by way of a non-limiting example, wherein.

The same numbers and the same reference letters in the Figures identify the same components or functionally equivalent components, elements or sizes.

DETAILED DESCRIPTION OF THE PREFERRED EMBODIMENTS

Figure 1:
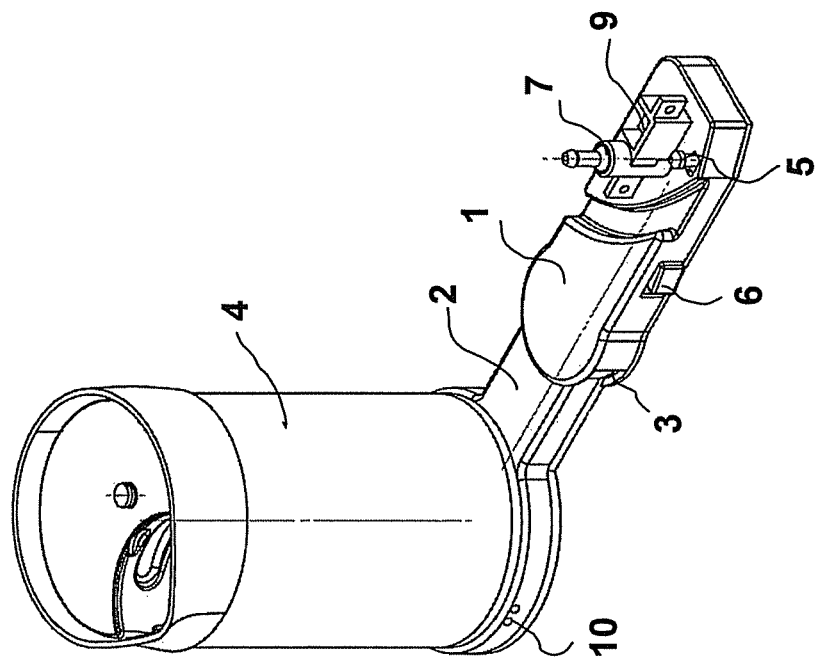
FIG. 1 shows some overall views of the steam unit subject of the present invention.
Figure 1:
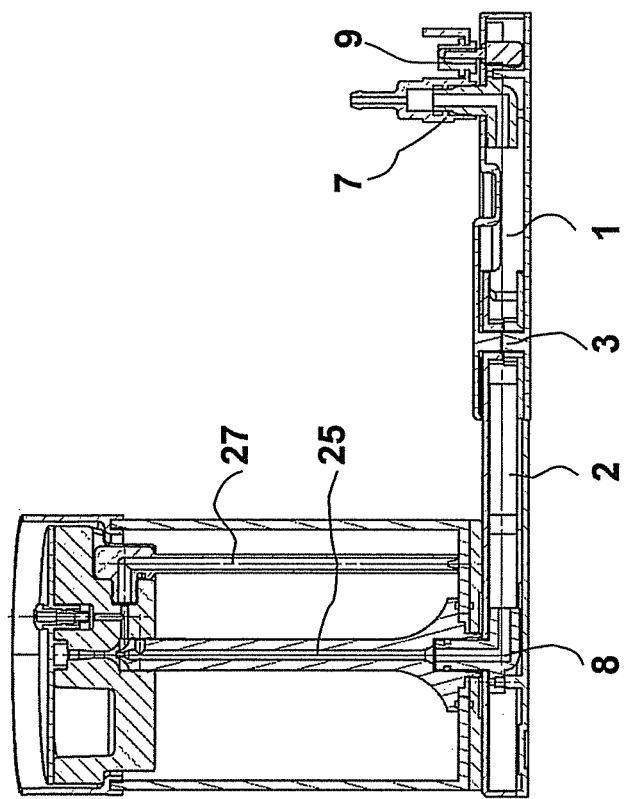

With reference to FIG. 1, the steam unit comprises an external supporting island (1, 2) which connects removably to a machine for espresso beverages (hereinafter machine), and a tank 4 for frothing milk, the base of which connects removably to the external end of the supporting island.

For example, the supporting island is composed of two parts, a first part 1 which is connected fixedly to the base of the machine (indicated in FIGS. 6 and 7 with number 71), and a second pivoting part 2, which holds the tank 4 and is provided with a rotating pivot 3 with respect to the first part.

The supporting island can include the following parts.
A) A system for mechanical fastening 5, 6 to the base of the machine, of the type which allows removal of the island, possible variants of embodiments of which are shown in FIGS. 1 and 4.

The variant in FIG. 1 shows a button 6 and a raised pin 5, connected to the button 6 with an internal link mechanism. The pin 5 can penetrate a specific slot provided on the base of the machine, in which it fixes the island in a locked position. By pressing the button 6, the pin 5 slides horizontally, disconnecting from the slot of the base of the machine, to allow the island to be removed.

Figure 4:
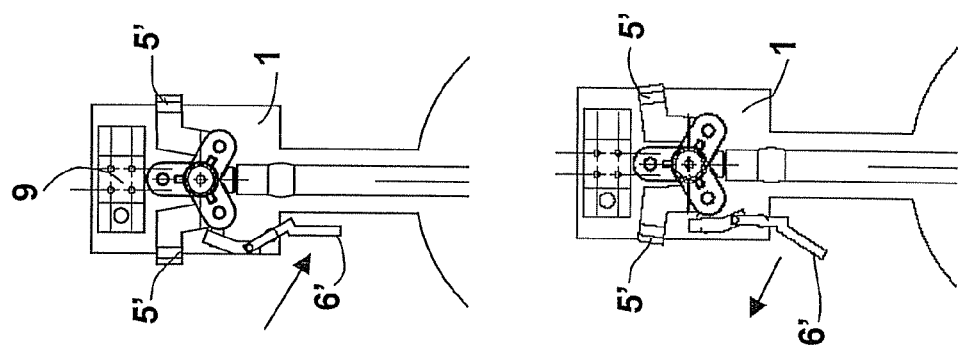
FIG. 4 shows an example of the device for fastening the steam unit to the machine.

The variant in FIG. 4 has a lever 6' connected with a link mechanism with two retaining teeth 5' positioned symmetrically at the sides of the first part 1 of the island. In the position of connection of the island to the machine, the lever 6' is held in contact with the island, for example by a spring, and the two retaining teeth 5' project from the edge of the island, to be fixed in suitable recesses produced in the machine body. In the release position, the lever 6' is rotated outwards, and the teeth 5' retract inside the island to allow release.

B) A hydraulic circuit to supply steam to the tank, possible variants of embodiments of which are shown in FIGS. 1, 5, 6 and 7.

A hydraulic pipe is present inside the island. A first steam connection 7 is provided for connection to the base of the machine and a second steam connection 8 for connection to the base of the tank in the central position of the platform housing the tank.

Figure 6:
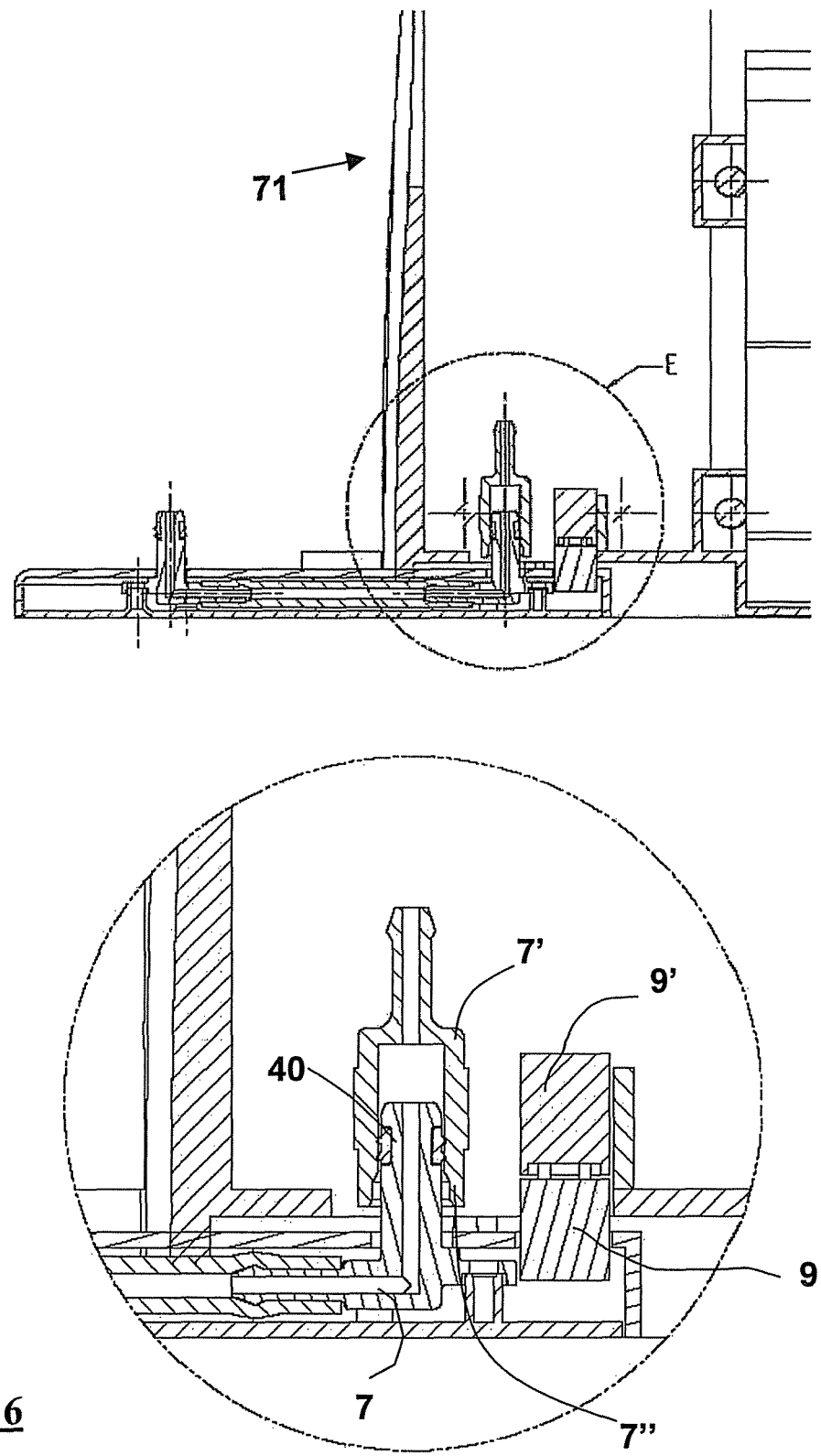
Figure 7:
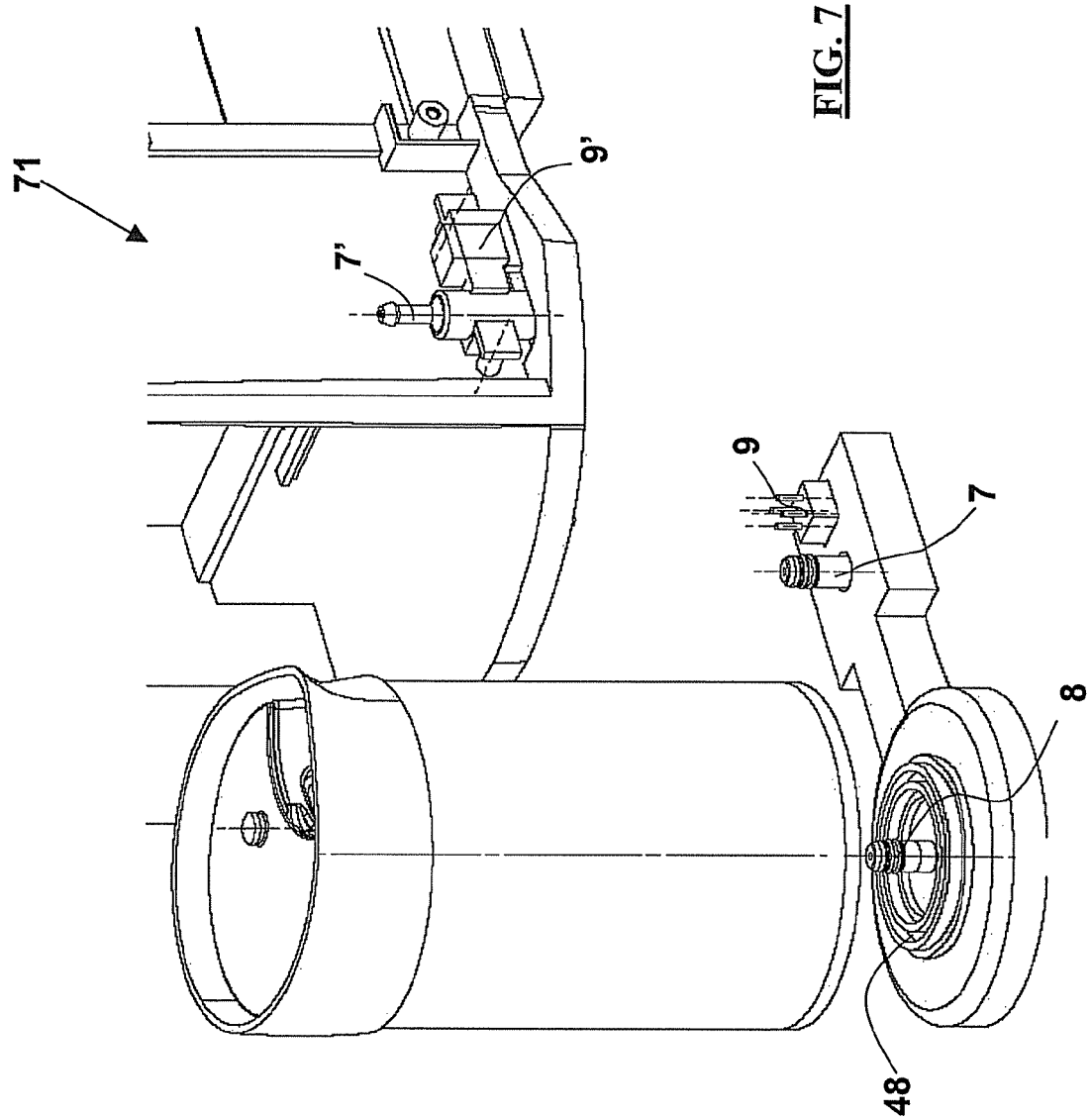
FIG. 7 shows an axonometric view of the steam unit and of the part of the machine including the connection with the steam unit.

The first steam connection 7 on the machine side, FIGS. 1, 6 and 7, is provided with a male part 7 and a female part 7', held sealed by a gasket 40. For example, the male part is on the island side, while the female side is on the machine side.

Optionally, a double cap with a retaining ring can be inserted, suitable to cover both the hydraulic connection and the electrical connection on the machine side, in such a way that it cannot be removed from the machine, so that if the island has to be disconnected, the user still has a sealing cap to prevent the connections from being soiled or damaged.

Figure 5:
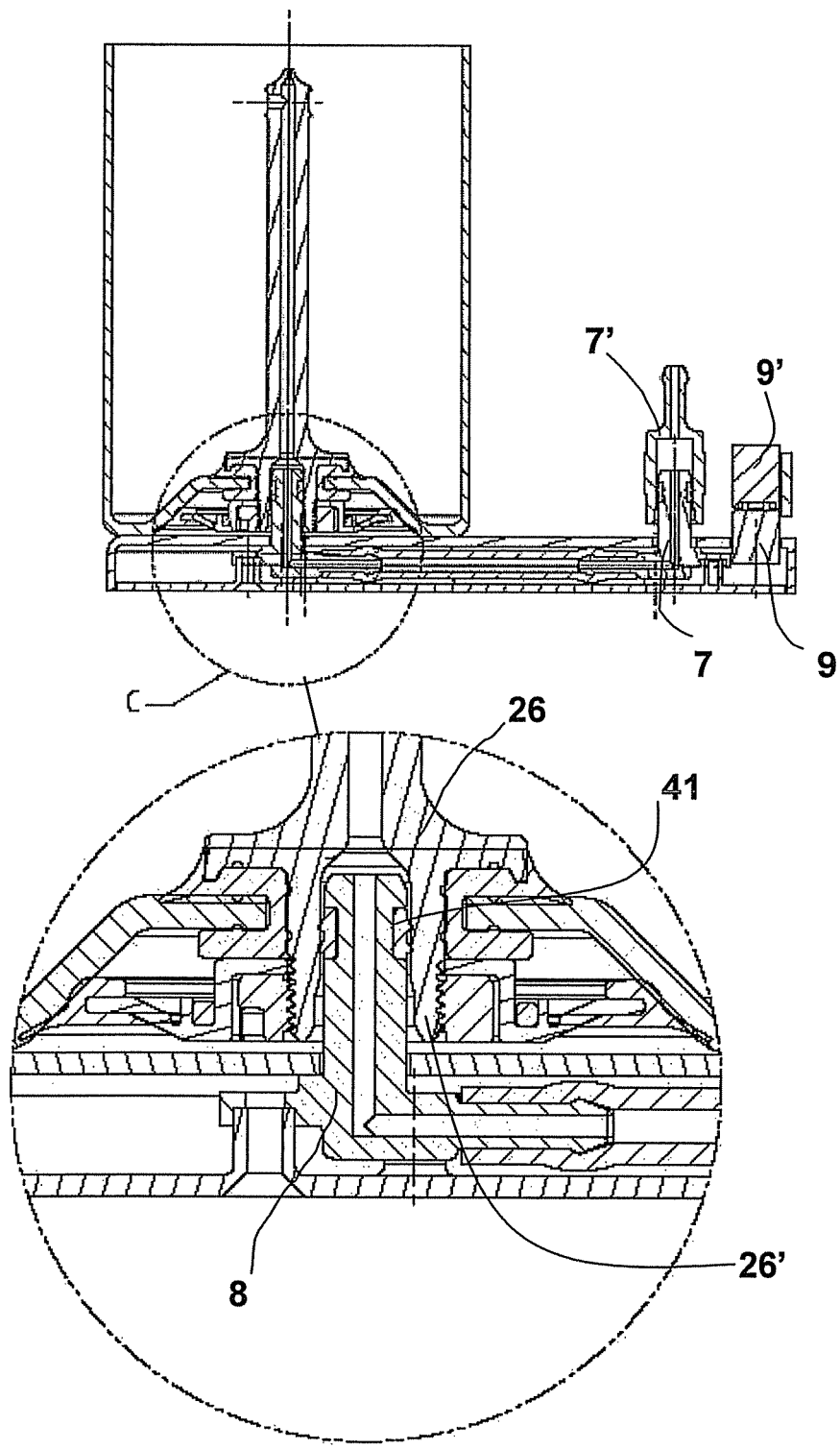
FIGS. 5 and 6 show details of the hydraulic connections between the tank and the supporting island and between the supporting island and the machine.

Similarly, the second steam connection 8 on the tank side, FIGS. 1, 5 and 7, is provided with a male part 8 and a female part 26, held sealed by a gasket 41. For example, the male part is on the island side, while the female side is on the tank side and is part of the hydraulic connection 26 described hereunder.

The gaskets 40 and 41 are for example double lip O-rings. The female end parts 7" and 26' of the steam connections have an enlarged inner edge in the shape of an overturned cone, which is located beyond said gaskets when the connection is established.

The structure of the gaskets 40 and 41 and of the inner edges 7" and 26' form a hydraulic safety device: upon detachment of the female parts from the respective male parts, when the tank is removed from the island, or the island is removed from the machine, any residual steam present in the pipes at the time of removal is directed downwards, with progressive and slow release, exploiting the extension of the lower edge of the female end parts, in order to prevent said residual steam from being directed upwards towards the face of the user.

Figure 8:
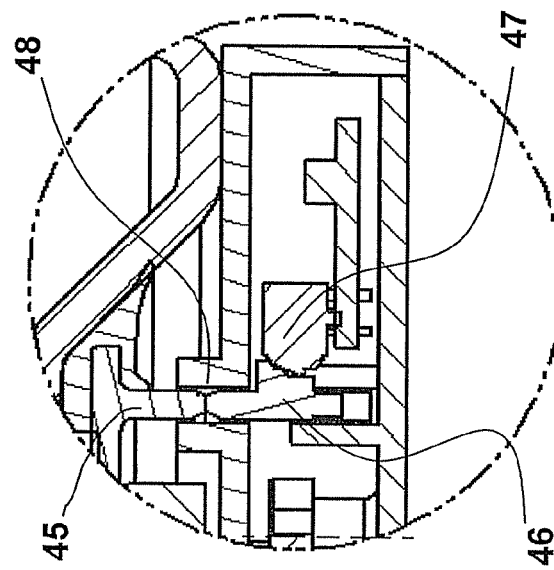
FIG. 8 shows a detail of an electrical switch positioned between the tank and the island.

C) An electrical circuit including a connector in the zone of connection to the machine, indicated in FIGS. 6, 7 with references 9 and 9', and a microswitch in the base which houses the tank, indicated in FIG. 8 with the references 45, 46 and 47. The connector 9, 9' connects the island to the machine, while the microswitch 45, 46, 47 is operated by the weight of the tank. In this way a control is implemented by the electronic part of the machine, relating to:

the presence of the island, through the connector, which allows electrical connection of the island to the machine;

the presence of the tank on the island, through the microswitch, operated by the weight of the tank.

If the results of both the previous controls are positive, the steam circuit of the machine is enabled to supply steam to the island and then to the tank, and consequently to activate operation of the steam unit. Otherwise, if even only one of the two checks is negative, the output of steam is not enabled.

In the non-limiting example illustrated, the first connector is composed of a male connector 7 fixed to the island 1, and a female connector 7' fixed to the machine body.

The microswitch comprises: a downward projection 45 in the hydraulic connection 26 of the base of the tank; a raised seat 48 in the base of the platform 2 of the island, in which a plunger 46, with a spring to activate a switch 47, can slide. The switch produces an electrical contact when the plunger 46 is pushed downwards by the projection 45 upon placing the tank on the platform. The raised seat 48 prevents any residual liquid on the platform from penetrating the seat of the plunger 46.

For example, the raised seat 48 in the base is in the shape of a double circular crown, and the projection 45 on the base of the tank is also in the shape of a circular crown. In this way the microswitch 46, 47 is operated in any angular position of the tank on the base. Moreover, the microswitch can be positioned in any point of the circular crown. The island is also provided with LEDs 10 to indicate the operating condition, for example a green LED for on, a red LED for off, for example when the tank is removed from the island. For example, the LEDs are positioned in the base housing the tank.

Figure 2:
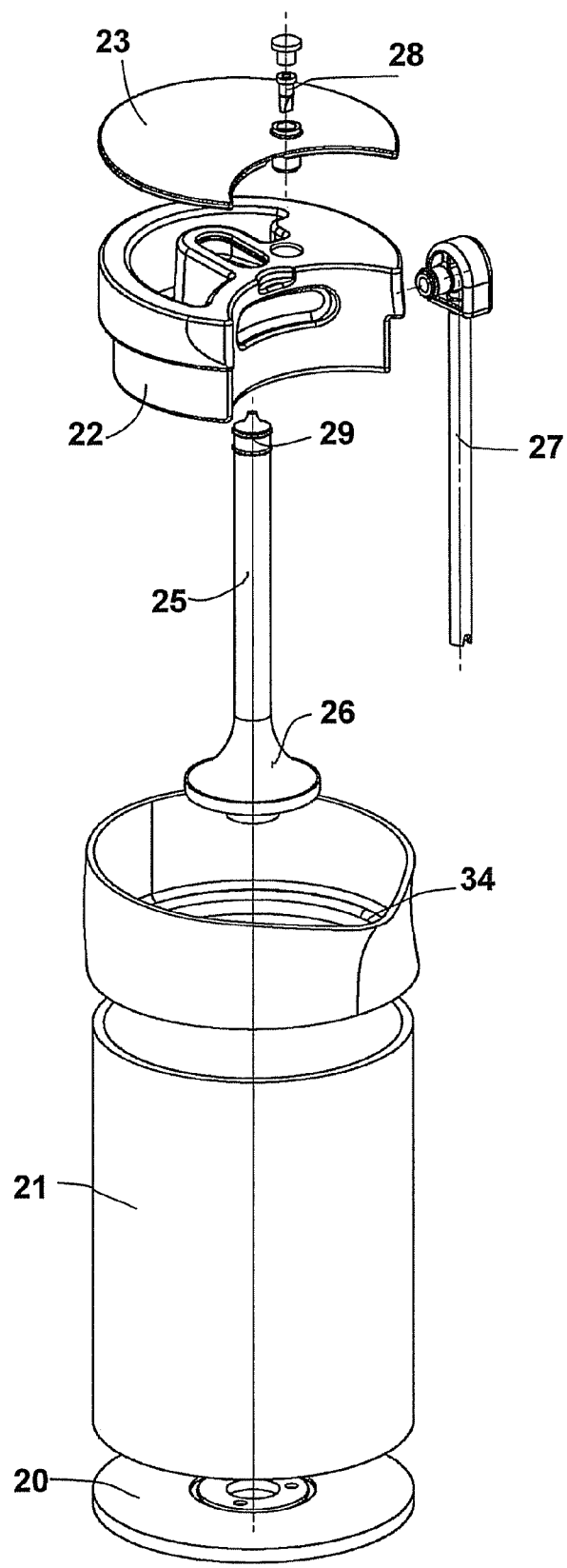
FIGS. 2 and 3 respectively show an exploded view of the component parts and some views of the tank subject of the present invention.
Figure 3:
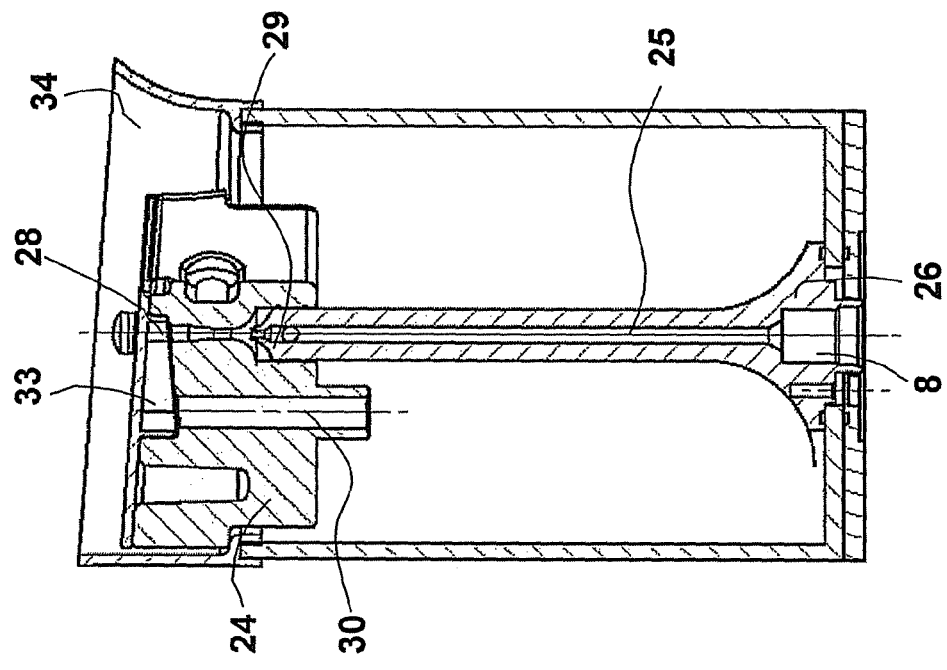
Figure 3:
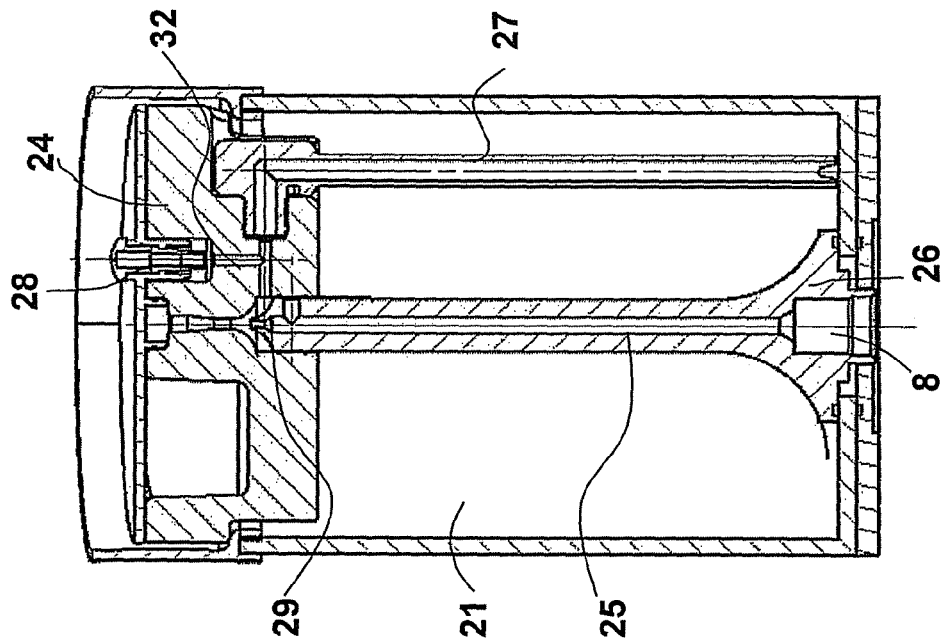

With reference to the FIGS. 2 and 3, the tank 4 for frothing milk comprises:

a base 20 for connection with the platform of the island;

a side surface 21, for example cylindrical in shape and transparent;

an upper covering part 22, including a lid 23, an inner compartment 24 where milk is emulsified, and a spout opening 34 for pouring and adding milk;

a steam output pipe 25 placed inside the tank, in the centre, and which is connected between the base 20 and the inner compartment 24 of the upper part of the tank. The lower terminal part thereof comprises a hydraulic connection 26 to the steam connection 8 of the island, described hereinbefore.

a pipe for suction of milk 27, placed inside the tank and connected to the inner compartment 24 of the upper part, suitable to suck up milk from the base and deliver it to the compartment.

A valve 28, for example of the lip type, is also housed in the inner compartment 24 of the upper part of the tank, for intake of air from outside. A hydraulic connection 32 is created between the steam delivery nozzle 29 of the output pipe 25, the pipe for suction of the milk 27 and said valve 28. The steam delivered from the output pipe creates a vacuum pressure in the hydraulic connection which, through a Venturi effect, causes suction of the milk from the base of the tank and of air from outside through the valve. The milk is emulsified by mixing with air and heated by the hot steam, thereby obtaining heated and frothed milk which is sent towards the upper part 33, to then drop into the tank through a recess 30 in the compartment for connection to the inside of the tank.

The frothed milk tends to remain on the surface of the milk in the tank, guaranteeing continuity of suction of the milk in liquid state by the suction pipe from the base of the tank. To use the frothed milk the tank is removed from the support without effort or rotation and is poured from the outlet spout.

The tank can also be used to heat beverages. If a generic beverage is placed in the tank instead of milk, the steam unit forming the object of the invention can cause heating of the beverage. This is sucked from the base of the tank by means of the suction pipe 27 and brought into contact with the steam delivered from the nozzle 29 of the output pipe 25, which causes heating, to then drop inside the tank through the recess 30.

Variants of the non-limiting embodiment described are possible, without however departing from the scope of protection of the present invention, including all equivalent embodiments for those skilled in the art.

For example, with modifications within the reach of those skilled in the art, it is possible to produce the connection of the supporting island to the coffee machine in the side part of the latter, rather than on the base. The shapes of the respective steam and electrical connections must be suitably modified, without modifications to the functions.

Figure 9:
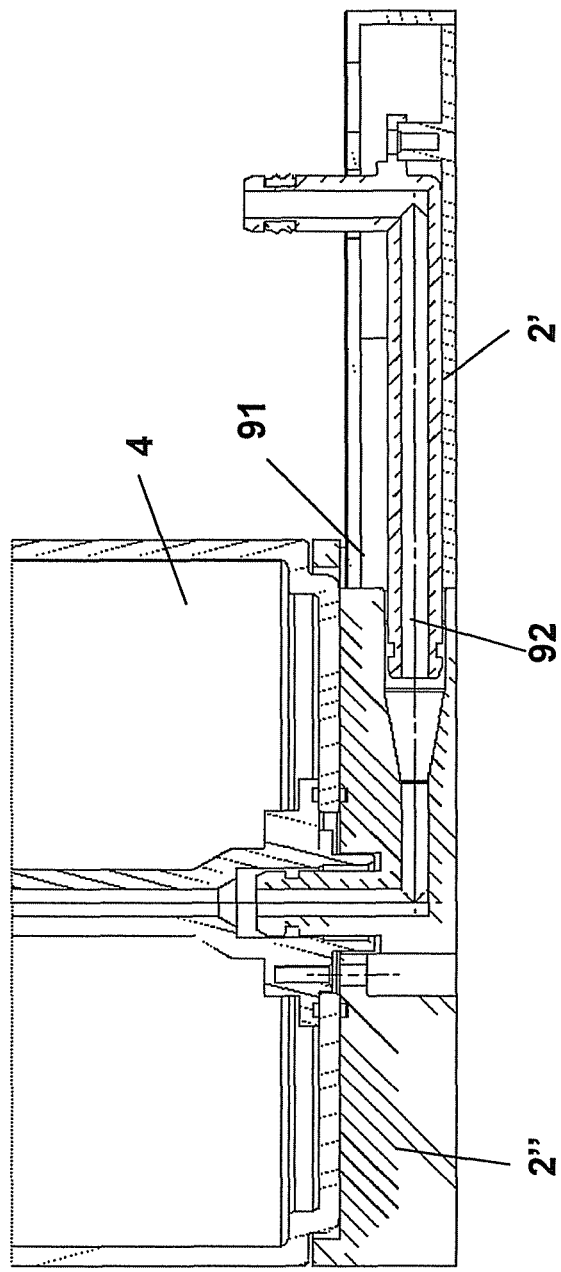
FIG. 9 shows a variant of the side connection of the tank to the island.

In another variant visible in FIG. 9, the supporting island can be connected on the tank side in a lower side position of the tank. The part 2 of the island is divided into two parts 2' and 2" which are connected by a further hydraulic connection 92 of the male-female type and by a further electrical connection, not shown. The two parts 2' and 2" can be disconnected and the tank 4 can be released from the island, remaining connected to the part 2" of the island, or without said part.

Figure 10:
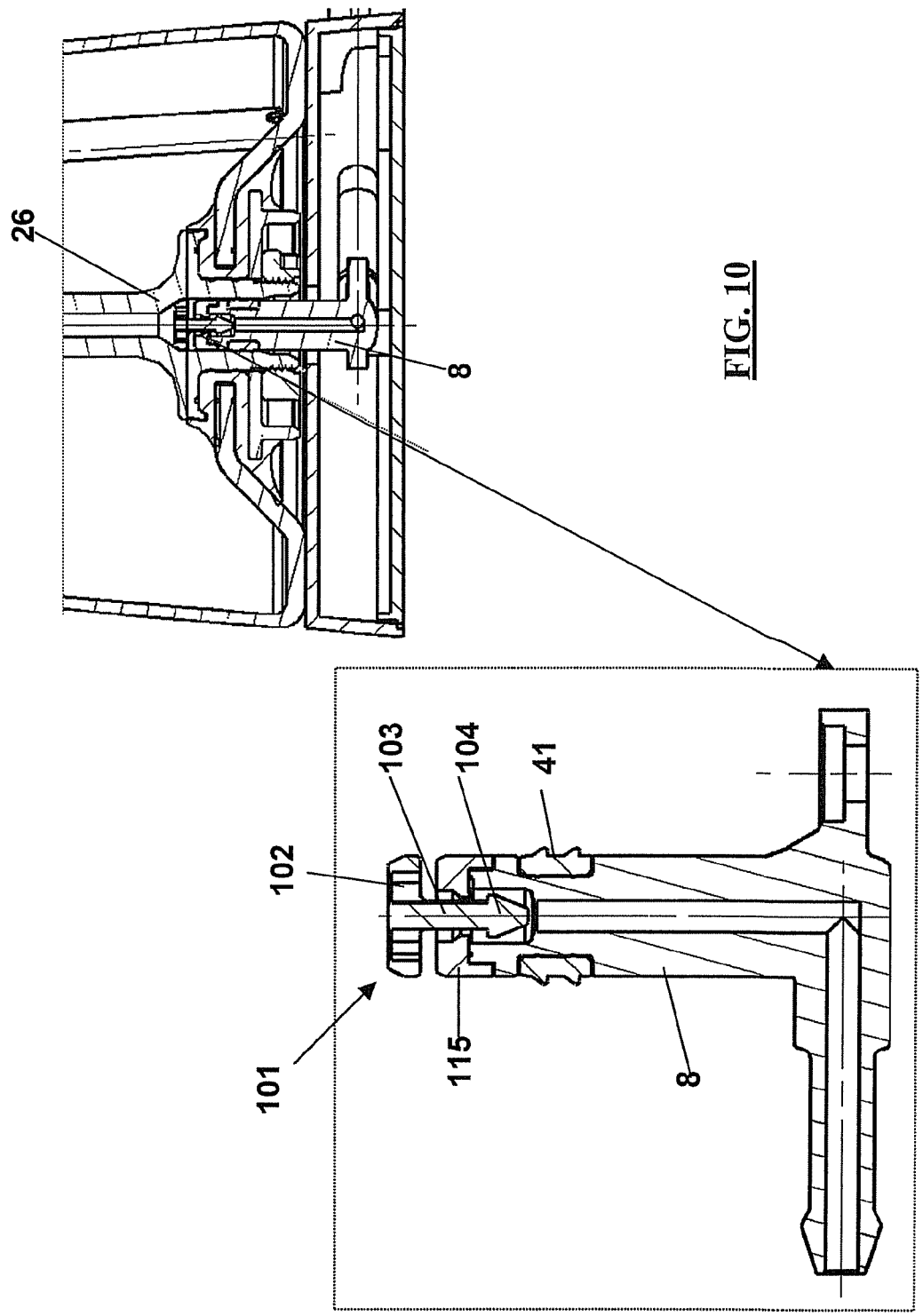
FIG. 10 shows a variant relative to connection of the tank to the island including a throttle valve.

In a further variant shown in FIG. 10, in reference to the hydraulic connection between the base of the tank and the supporting island already described with reference to FIG. 5, the top of the male part 8 of the hydraulic connection comprises a cap 115 perforated in the centre, inside which the central stem part 103 of a throttle valve 101 moves. This valve also has an enlarged head 102 provided with holes in the upper part, and a swelling 104 at the lower end. When the tank is regularly positioned and connected to the island, the head 102 knocks against the upper surface of the female part 26 of the hydraulic connection, holding the swelling 104 in a position that does not obstruct the passage of steam inside the inner pipe towards the tank; the steam passes through the holes in the head 102. When, on the other hand, the tank is removed, the pressure of residual steam in the hydraulic circuit (output of steam is interrupted by the electrical control described hereinbefore) pushes the valve 101 upwards, so that the swelling 104 engages against the cap 115, obstructing the pipe and preventing the passage of steam. This forms a further safety device against the emission of steam towards the person using the tank.

Figure 11:
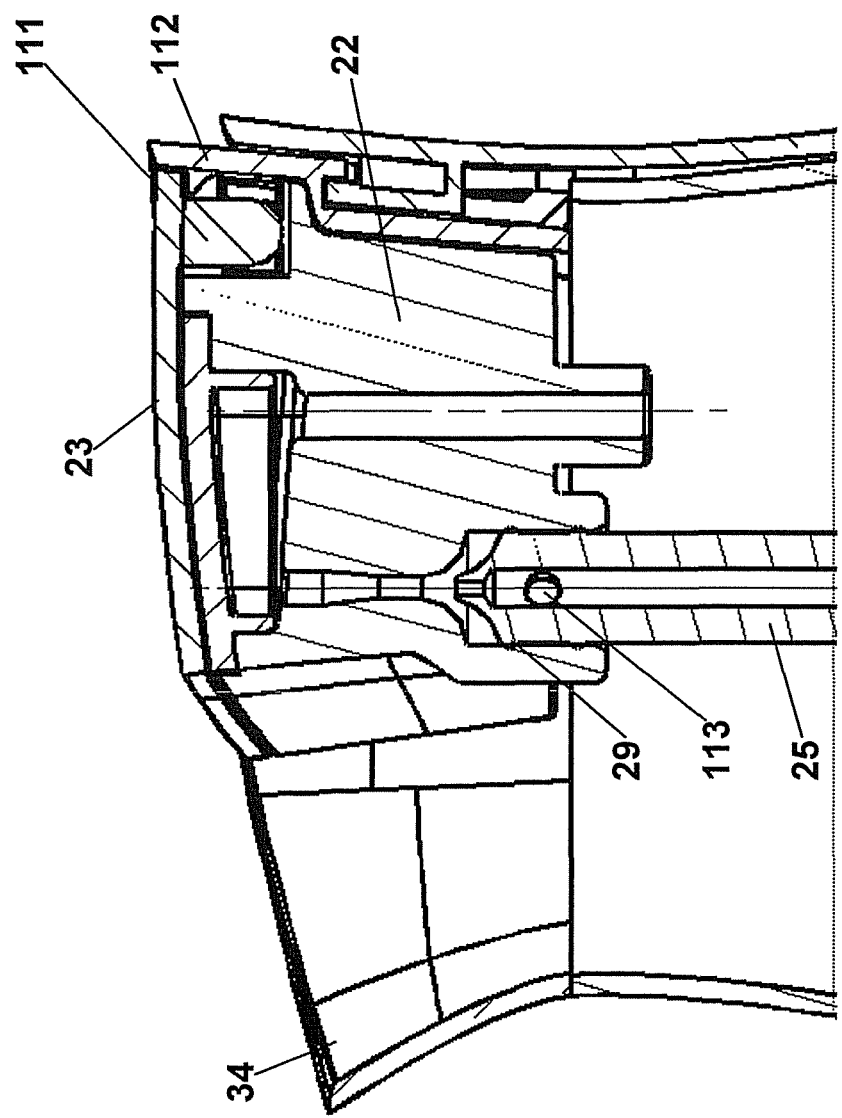
FIG. 11 shows a variant of the tank including a lid and a further safety device.

In a further variant visible in FIG. 11, the lid 23 of the top of the tank comprises a pin 111 on which it can rotate to open, in the part opposite the spout opening 34. However, aperture of the lid is not possible when the upper covering part 22 is positioned correctly inside the tank, as the back edge of the lid 23 knocks against a raised part 112 of the upper edge of the tank. Instead the lid 23 can be opened when the upper part 22 is removed from the tank. This provides a further safety device against dangerous output of steam from the upper part of the tank towards the person using it.

Moreover, the upper part 29 of the steam output pipe 25 comprises a side hole 113 positioned between two side swellings of the O-ring type gasket which guarantees seal of the hydraulic connection. Upon removal of the upper part 22, this is progressively distanced from the output pipe 25, and the side hole 113 allows the release of residual steam in a lateral direction inside the tank, before the connection has been completely removed. This provides a further safety device against dangerous leakage of steam from the upper part of the tank towards the person using it.

In a further variant not shown in the figures, the first steam connection on the machine side (7, 7'), described with reference to the FIGS. 6 and 7, comprises a safety valve of the expansion type which in the event of clogging of the steam pipe, and consequent increase in the steam pressure beyond a certain limit (i.e. 3.5 bar) diverts the flow of steam for safety, for example, back towards the water reservoir of the machine.

The advantages deriving from the use of the present invention are apparent. For example:

The tank is separate from the coffee machine and from the supporting island, can be removed and replaced as desired without requiring operations on external lock and release members.

There are no electrical or hydraulic circuits inside the tank, these being transferred to the supporting island.

There are no valves along the steam pipe which is inserted in the tank, as milk is emulsified through the Venturi effect. In this way, problems related to clogging or difficult cleaning of the steam pipe are avoided.

The tank has an inner structure (central steam pipe, absence of electrical devices and mechanical locks) which makes it completely maneuverable (it can be rotated as desired when it is on the island) and easy to wash. It can be positioned at any angle and also turned inside the support. Moreover, to fill up the milk in the tank it is unnecessary to remove it from the support, or to remove the lid, as it can be filled up through the spout opening 34 for pouring the emulsified milk; it can be removed from the seat on the island without the aid of buttons, lever mechanisms 9 or the disconnection of secondary or "flying" external pipes.

The steam unit with external fastening subject of the invention is an optional element which can also be installed after purchasing the machine, of the "plug and play" type, i.e. which is automatically recognized and activated by the electronics of the domestic appliance.

From the description above those skilled in the art are able to carry out the invention without introducing further constructional details.

The invention claimed is:

1. A steam unit for a machine for making beverages, the steam unit including:
   a supporting island with a fastener configured to be removably connected to a base of said machine at a lower part of said machine; and
   a tank having a base at a lower part of the tank,
   the supporting island including a first connection at a first end for removable connection to the machine, a second connection at a second end opposite the first end for removable connection to the base of the tank for connecting the second connection to a steam output pipe located inside the tank in a substantially central position of the tank, and a pipe between the first and second connections, said machine being configured to deliver steam to said tank via said first connection, said pipe and said second connection,
   said tank including an upper part for heating and emulsifying a beverage to form an emulsified beverage, said upper part being opposite said base at the lower part of said tank and being located further away from the supporting island than the lower part,
   wherein the fastener includes a pin configured to engage a slot of the machine in a locked position and disengage from the slot for removal of the supporting island from the machine,
   wherein the base of the tank is supported on the supporting island in an operating position of the machine, and
   wherein said pin is further configured to slide horizontally to disengage from the slot and allow the removal of the supporting island from the machine.

2. The steam unit as claimed in claim 1, wherein said tank comprises:
   a covering part located at said upper part, the covering part being configured to heat and emulsify the beverage and including an air intake member for intake of air from outside into inside of said covering part; and
   a suction pipe placed inside the tank and connected to the inside of said covering part, the suction pipe being configured to suck up the beverage from the base of the tank and deliver it to the inside of said covering part.

3. The steam unit as claimed in claim 2, wherein said tank comprises, in the inside of said covering part, a third connection between said steam output pipe, said suction pipe and said air intake member, the steam delivered from said steam output pipe creating vacuum pressure which, through Venturi effect, causes suction of the beverage from the base of the tank through said suction pipe and causes suction of air from outside through said air intake member, causing mixing of the steam and the air with the beverage and forming said emulsified beverage.

4. The steam unit as claimed in claim 3, wherein said tank has, in the inside of said covering part, a recess from which said emulsified beverage drops into said tank.

5. The steam unit as claimed in claim 2, wherein said tank has an opening in said covering part, where the emulsified beverage can be poured out through the opening and the tank can be filled with the beverage through the opening.

6. The steam unit as claimed in claim 2, wherein said tank comprises a lid in the covering part, the lid comprising a pin on which the covering part can rotate to open, a back edge of said lid engaging against a raised part of an upper edge of the tank, preventing rotation of said pin to open the lid when said upper covering part is positioned inside the tank.

7. The steam unit as claimed in claim 2, wherein said steam output pipe has one or more side holes in an upper part which connects to said covering part, said one or more side holes allowing said steam to be released in a lateral direction inside the tank before said covering part has been completely removed from said steam output pipe.

8. The steam unit as claimed in claim 1, further comprising an electrical circuit configured to:
   detect that said supporting island is fastened to said machine;
   detect that said tank is connected to said supporting island; and
   enable supply of steam to said island and then to said tank, only if both said supporting island and said tank are connected to said machine and said supporting island, respectively, as detected by the electrical circuit.

9. The steam unit as claimed in claim 8, wherein said electrical circuit comprises:
   a connector activated when said supporting island is fastened to said machine and placed in a zone for connection of said island to the machine; and
   a microswitch activated when said tank is connected to said supporting island and placed in the base housing the tank.

10. The steam unit as claimed in claim 1, wherein said first and second connections are provided with male parts and female parts connected by gaskets, said male parts being on the supporting island, and said female parts being on the machine and the tank.

11. The steam unit as claimed in claim 10, wherein at least one female part of said female parts of said first and second connections are provided with an enlarged inner edge in shape of an overturned cone, wherein the enlarged inner edge is located beyond said gaskets when a connection is established, so that when said at least one female part is detached from a respective male part, any residual steam present in said hydraulic circuit at time of removal is directed downwards, with progressively slow release.

12. The steam unit as claimed in claim 10, wherein a top of a male part of said second connection comprises a throttle valve which interrupts flow of the steam in said second connection when the tank is removed.

13. The steam unit as claimed in claim 11, wherein said gaskets are of the double lip O-ring type.

14. The steam unit as claimed in claim 10, wherein said first connection comprises a safety valve of an expansion type, wherein the safety valve is activated when the pipe is clogged and consequent increase in steam pressure beyond a predetermined limit.

15. The steam unit as claimed in claim 1, wherein said supporting island comprises a first part which is connected fixedly to said machine, and a second pivoting part which holds said tank and is provided with a rotating pivot for rotating the second part with respect to the first part.

16. The steam unit as claimed in claim 1, wherein said fastener further comprises a button, and wherein by pressing said button, said pin slides horizontally, disconnecting from said slot, and allowing the supporting island to be removed from the base of the machine.

17. The steam unit as claimed in claim 8, wherein said electrical circuit further comprises displaying devices to indicate an active or inactive operating state of the supporting island.

18. The steam unit of claim 1, wherein said supporting island has a first part rotatably connected to a second part, the first part being configured to receive the base and support the tank in the operating position, and the second part being configured to receive the machine and support the machine in the operating position.

19. The steam unit of claim 1, wherein the tank further comprises a suction pipe placed inside the tank between the base and the upper part.

20. The steam unit of claim 19, wherein the steam output pipe is substantially parallel to the suction pipe.

21. The steam unit of claim 19, wherein the suction pipe is configured to suck up the beverage from the base to the upper part of the tank, and wherein the steam output pipe is configured to deliver steam up from the base to the upper part of the tank to heat and emulsify the beverage received from the suction pipe and form the emulsified beverage for dropping down into said tank.

22. The steam unit as claimed in claim 1, wherein said pin is further configured to retract inside the supporting island to disengage from the slot and allow the removal of the supporting island from the base of the machine.

23. A tank for use in a steam unit for a machine for making beverages, the steam unit including:
   a supporting island with a fastener configured to be removably connected to a base of said machine at a lower part of said machine; and
   the tank having a base at a lower part of the tank, wherein the base of the tank is configured to be removably connected to a first connection of said supporting island, said supporting island including a pipe and a second connection to deliver steam from said machine to a steam output pipe located inside said tank in a substantially central position of said tank via said second connection, said pipe and said first connection;
   said tank including an upper part for heating and emulsifying a beverage to form an emulsified beverage, said upper part being opposite said base at the lower part of said tank and being located further away from the supporting island than the lower part,
   wherein the fastener includes a pin configured to engage a slot of the machine in a locked position and disengage from the slot for removal of the supporting island from the machine,
   wherein the base of the tank is supported on the supporting island in an operating position of the machine, and
   wherein said pin is further configured to slide horizontally to disengage from the slot and allow the removal of the supporting island from the machine.

24. An apparatus for making a beverage comprising:
   a supporting island;
   a tank for holding a liquid ingredient of the beverage, wherein the tank has a base at a lower part of the tank and has an upper part for heating and emulsifying the liquid ingredient to form an emulsified beverage, the upper part being opposite the base at the lower part of the tank and being located further away from the supporting island than the lower part; and
   a machine for making the beverage and providing steam to the tank for heating the liquid ingredient;

the supporting island having a first connection at a first end for removable connection to the machine, a second connection at a second end opposite the first end for removable connection to the base of the tank for connecting the second connection to a steam output pipe located inside the tank in a substantially central position of the tank, and a pipe between the first and second connections, said machine being configured to deliver the steam to said tank via said first connection, said pipe and said second conection, wherein the supporting island includes a pin configured to engage a slot of the machine in a locked position and disengage from the slot for removal of the supporting island from the machine, and wherein said pin is further configured to slide horizontally to disengage from the slot and allow the removal of the supporting island from the machine.

25. The apparatus of claim 24, wherein the first connection is rotatably connected to the second connection.

* * * * *